United States Patent
Zitzelsperger

(10) Patent No.: US 10,461,532 B2
(45) Date of Patent: Oct. 29, 2019

(54) SUPPLYING AN ELECTRICAL LOAD WITH ELECTRICAL ENERGY FROM A VOLTAGE SOURCE

(71) Applicant: OSRAM GmbH, Munich (DE)

(72) Inventor: Thomas Zitzelsperger, Munich (DE)

(73) Assignee: OSRAM GMBH, Munich (DE)

(*) Notice: Subject to any disclaimer, the term of this patent is extended or adjusted under 35 U.S.C. 154(b) by 165 days.

(21) Appl. No.: 15/809,410

(22) Filed: Nov. 10, 2017

(65) Prior Publication Data
US 2018/0138700 A1    May 17, 2018

(30) Foreign Application Priority Data

Nov. 11, 2016 (DE) .......... 10 2016 121 658

(51) Int. Cl.
*H02J 1/04* (2006.01)
*G05F 3/22* (2006.01)
*H05B 33/08* (2006.01)
*G05F 1/46* (2006.01)

(52) U.S. Cl.
CPC ............ *H02J 1/04* (2013.01); *G05F 1/46* (2013.01); *G05F 3/22* (2013.01); *H05B 33/0812* (2013.01); *H05B 33/0845* (2013.01)

(58) Field of Classification Search
CPC ..... G05F 1/46; G05F 3/22; H02J 1/04; H05B 33/0845; H05B 33/0812
See application file for complete search history.

(56) References Cited

U.S. PATENT DOCUMENTS

| 6,798,177 | B1 | 9/2004 | Liu et al. | |
|---|---|---|---|---|
| 2009/0134816 | A1* | 5/2009 | Sloan | H05B 33/083 315/307 |
| 2010/0238689 | A1* | 9/2010 | Fei | H02M 3/33523 363/21.16 |
| 2011/0068703 | A1* | 3/2011 | McKinney | H05B 33/0815 315/210 |
| 2015/0173133 | A1* | 6/2015 | Seki | H05B 33/0818 315/185 R |
| 2016/0366733 | A1* | 12/2016 | Wang | H05B 33/0815 |

FOREIGN PATENT DOCUMENTS

WO    2009/083962 A1    7/2009

* cited by examiner

*Primary Examiner* — Jared Fureman
*Assistant Examiner* — Duc M Pham
(74) *Attorney, Agent, or Firm* — Fitch, Even, Tabin & Flannery LLP

(57) ABSTRACT

The invention relates to a method for supplying an electrical load with electrical energy from a voltage source, in which an electrical charge storage for storing electrical charge is supplied with a preset electrical current by means of a constant current circuit connected to a voltage source, wherein a regulated electrical potential is provided for the load by means of a linear regulator circuit connected to the charge storage, wherein the charge storage is supplied with an electrical bypass current by means of a bypass circuit in parallel with the current of the constant current circuit, wherein the bypass circuit is controlled by means of a control signal of a control unit, wherein an electrical charge storage voltage at the charge storage is captured and the control signal is provided depending on the captured charge storage voltage.

14 Claims, 3 Drawing Sheets

SUPPLYING AN ELECTRICAL LOAD WITH ELECTRICAL ENERGY FROM A VOLTAGE SOURCE

TECHNICAL FIELD

The invention relates to a circuit assembly for supplying an electrical load with electrical energy from a voltage source, including an input terminal for connecting to the voltage source, an output terminal for connecting to the load, an electrical charge storage for storing electrical charge, a constant current circuit electrically coupled to the input terminal and the charge storage for supplying the charge storage with a presettable electrical current, a linear regulator circuit electrically coupled to the charge storage and the output terminal for providing a regulated electrical potential at the output terminal, a bypass circuit controllable by means of a control signal, which is electrically coupled to the input terminal and the charge storage in parallel with the constant current circuit for supplying the charge storage with an electrical bypass current, as well as a control unit for providing the control signal. Furthermore, the invention relates to a lighting device including an illuminant, a voltage source for supplying the illuminant and an electrical load with electrical energy as well as including a circuit assembly for electrically coupling the voltage source to the electrical load. Finally, the invention also relates to a method for supplying an electrical load with electrical energy from a voltage source, in which an electrical charge storage for storing electrical charge is supplied with a preset electrical current by means of a constant current circuit connected to the voltage source, wherein a regulated electrical potential is provided for the load by means of a linear regulator circuit connected to the charge storage, wherein the charge storage is supplied with an electrical bypass current in parallel with the current of the constant current circuit by means of a bypass circuit, wherein the bypass circuit is controlled by means of a control signal of a control unit.

BACKGROUND

Circuit assemblies, lighting devices with such circuit assemblies as well as also methods for operating such circuit assemblies are extensively known in the prior art such that a separate printed evidence is not required hereto. Such circuit assemblies serve for supplying loads with electrical energy, which is provided by the electrical voltage source. In lighting devices, the load can be formed by an electrical circuit, which provides the lighting device with an additional function, which is not necessarily related to the actual lighting function of the lighting device. Hereby, so-called "smart" lighting devices can be provided, which allow additional functionality.

For the intended operation of the load, it is required to supply it with electrical energy, which is usually provided by the voltage source in lighting devices or the generic type, which also supplies the illuminant of the lighting device with electrical energy at the same time. For example, the voltage source can be a power supply unit, which is connected to a public energy supply network to be able to provide electrical energy from the public energy supply network for the intended operation of the lighting device. Usually, the voltage source is configured for the supply of the illuminant. Correspondingly, the voltage source comprises an internal resistance, which ensures the reliable and intended operation of the illuminant. With respect to the power and the internal resistance, the voltage source is thus usually adapted to the illuminant. If the load is now additionally supplied with electrical energy from the voltage source, thus, due to energy demand fluctuations of the load, voltage fluctuations at the voltage source can also occur due to the fluctuating load, which can affect the illuminant. For example, the brightness of the illuminant can be impaired by the voltage fluctuations such that corresponding brightness fluctuations can be the result. For example, if the illuminant comprises light emitting diodes or a light emitting diode array, the voltage source is usually formed for providing a preset current for the light emitting diodes or the light emitting diode array. The internal resistance of the voltage source can be correspondingly highly formed, in particular if it is desired to operate the light emitting diodes or the light emitting diode array with a substantially constant current. Here, energy demand fluctuations of the load can have a particularly unfavorable effect.

Of course, the above mentioned problem is not restricted to lighting devices, but can basically occur in an operation of voltage sources of general type. A voltage source with a high internal resistance, which exhibits distinct voltage fluctuations with different loadings, is also referred to as a soft energy source or soft voltage source. In the operation of the load at a soft energy source or voltage source, the voltage of the energy source or voltage source can drop if enough electrical energy for a linear current flow through a constant current circuit cannot be supplied to the load from the energy source or voltage source, for example if the load does not require a constant, but a pulsating current in a particular operating state, because it is cyclically switched on and off. Switching on and off result in corresponding current fluctuations, which result in corresponding voltage fluctuations at the energy source or voltage source due to the internal resistance.

Further, it is known in the prior art to reduce the above mentioned problem in that a bypass circuit is connected in parallel with the constant current circuit on the one hand and this parallel connection is connected to a voltage regulator circuit in the manner of a linear regulator, which couples the parallel connection to the voltage source. Therein, the bypass circuit is activated and deactivated, respectively, in time-controlled manner, namely depending on switching on the voltage source. The retroactive effect on the voltage source in switching on the voltage source can be reduced by this circuit, but the circuit proves to be very expensive and moreover requires a supplementary voltage range for the operation of a required upstream voltage regulator. The possibilities of employment of this circuit assembly are therefore limited.

Therefore, the invention is based on the object to specify a circuit assembly, a lighting device as well as a method, which allow improved supply of the electrical load with electrical energy from the voltage source.

SUMMARY

A circuit assembly, a lighting device as well as also a method according to the independent claims are proposed by the invention as the solution.

Further advantageous configurations of the invention are apparent based on features of the dependent claims.

With respect to a generic circuit assembly, it is in particular proposed that the control unit is formed to capture an electrical charge storage voltage at the charge storage and to provide the control signal depending on the captured charge storage voltage.

With respect to a generic lighting device, it is in particular proposed that the circuit assembly is formed according to the invention.

With respect to a generic method, it is in particular proposed that an electrical charge storage voltage is captured at the charge storage and the control signal is provided depending on the captured charge storage voltage.

It is an aspect of the invention to be able to supply an electrical load from a soft energy source or voltage source, in particular if the load at least partially requires current in pulse-shaped manner for its intended operation. In order to be able to avoid undesired retroactive effects due to the soft energy source or voltage source as possible, a current loading of the soft energy source or voltage source is preferably to be kept as constant as possible. This can be achieved by the constant current circuit, by means of which the soft energy source, here the voltage source, can be substantially loaded with a presettable constant current. Thereby, it can be achieved that substantially stationary conditions appear at the energy source or voltage source. In particular retroactive effects like voltage fluctuations or the like can be reduced, if not even completely avoided at the energy source or voltage source. Thereby, retroactive effects on possible further loads connected to the energy source or voltage source can of course also be largely reduced or avoided as a consequence. Thus, in a lighting device, it can be avoided that illuminants supplied with electrical energy by the voltage source or the energy source are supplied substantially with uniform electrical conditions such that undesired effects like flickering of light emission or the like can be avoided.

In order to nevertheless be able to ensure the pulse-shaped current supply of the load, an electrical charge storage is connected to the constant current circuit on the load side, which is substantially continuously supplied with a, preferably constant, electrical current by the constant current circuit, such that the charge storage is supplied with electrical charge as a result. The charge storage can then provide the electrical charge stored in it to the load. Due to its characteristics, pulse-shaped currents or current pulses can in particular also be provided by the charge storage to be able to ensure the intended operation of the load.

A regulated electrical potential can be provided at the output terminal by the downstream linear regulator circuit, such that the load can preferably be supplied with a substantially constant electrical voltage. This is in particular advantageous if the load requires the supply with electrical energy in a preset voltage range for its intended operation, for example in electronic circuits, in particular semiconductor circuits, such as for example microprocessors, gate arrays, but also analog integrated circuits and/or the like.

An electrical capacity of the charge storage is preferably dimensioned such that a reliable electrical energy supply of the load can be ensured during its intended operation. The current can be correspondingly adapted preset, which is to be provided by the constant current circuit. Usually, the current of the constant current circuit is set to a constant value. However, it can also be provided that the value can be set—depending on the load to be supplied—for example by correspondingly fitting a component determining the current or the like.

However, in order to be able to absorb additional consumption fluctuations, for example in the form of current pulses, due to the intended operation of the load, the bypass circuit is additionally provided, which is controllable by means of the control signal of the control unit. The bypass circuit provides the electrical bypass current, which supplies the charge storage just as the current of the constant current circuit. Thereby, the charge storage is not only electrically charged by the current of the constant current circuit, but, if a corresponding control signal of the control unit is provided, additionally by the bypass current. Both the current of the constant current circuit as well as the bypass current are taken from the voltage source. The constant current circuit is therefore connected in parallel with the bypass circuit. Thereby, the current of the constant current circuit and the bypass current are usually also identically oriented. Unlike the prior art, thus, the bypass circuit is not time-controlled in the invention, but it is adequately controlled, namely independently of the charge storage voltage at the charge storage. Thereby, the operation of the bypass circuit can be activated and also again deactivated, respectively, at any points of time, namely preferably depending on the respectively required average electrical energy for the intended operation of the load.

Preferably, the charge storage is formed by one or more electrical capacitors, for example a foil capacitor, a ceramic capacitor, an electrolytic capacitor, combination circuits hereof or the like. Moreover, the charge storage can also include an accumulator, for example with one or also more galvanic cells, which can be connected in series and/or parallel depending on the required electrical voltage. Of course, the accumulator can also be provided in combination circuit with one or more capacitors, for example in the manner of a parallel connection or the like.

The voltage source can include an electrical power supply unit, but also an electrical generator, a fuel cell, an accumulator, combinations hereof and/or the like. In particular, it can also include a mains adapter, which obtains electrical energy from an energy supply network like the public energy supply network. Preferably, the voltage source provides an electrical DC voltage.

The linear regulator circuit can be an analog circuit, which serves for regulating an electrical input DC voltage to a smaller output DC voltage. Often, the output DC voltage is fixedly set. However, it can also be provided that it is adjustable. However, the linear regulator circuit can also be formed by a clocked energy converter, in particular a buck converter or the like. Moreover, instead of the buck converter, there is of course also the possibility that a boost converter or also a combination circuit hereof is provided.

The current of the constant current circuit is preferably a direct current just as the bypass current, which supplies electrical charge to the charge storage. Preferably, not only the current of the constant current circuit is constant, but also the current of the bypass circuit. However, in alternative configurations, it can also be provided that the bypass current is not constant, but can for example be adjusted by means of the control signal. For this purpose, it can be provided that the control signal has a value corresponding to the bypass current to be adjusted. The control signal can be an analog electrical signal. Moreover, the control signal can of course also be a digital signal.

Overall, an improved function of the circuit assembly and also of a lighting device equipped with the circuit assembly as well as also an improved corresponding proceeding can be achieved by the invention. The invention allows activating and/or deactivating the bypass circuit as needed to ensure the reliable energy supply of the load and keep a retroactive effect on the voltage source as low as possible at the same time. In particular, a self-regulating bypass circuit can be achieved, which can for example be formed as an analog circuit or the like.

The circuit assembly as well as also parts thereof, for example the constant current circuit, the linear regulator circuit, the bypass circuit as well as also the control unit, can each be formed as an electronic circuit. Preferably, they are formed as a semiconductor circuit. However, they can moreover also at least partially be formed by a correspondingly programmed computer unit, wherein analog-digital converters and digital-analog converters are preferably additionally provided in this case to allow signal adaptation. Thus, the control unit can for example include a computer unit, which provides the corresponding control signal for the bypass circuit. However, the above mentioned circuits are preferably formed by analog circuits, which comprise electronic components. They can at least partially also be formed as an integrated circuit, for example by a semiconductor chip or the like. The above mentioned circuits can at least partially also be integrally formed, that is as a common circuit.

Even if the invention proves to be particularly advantageous for application in voltage sources with a high internal resistance, it is nevertheless not restricted hereto. With other voltage sources too, in particular with a very low internal resistance, effects can advantageously arise, for example in power supply units with respect to network retroactive effects, harmonics and/or the like as well as also with respect to an electromagnetic compatibility such as for example radio interferences or the like.

According to a development, it is proposed that the control unit includes a comparison unit, which is formed to compare the captured charge storage voltage to a presettable comparative value and to deliver the control signal if the charge storage voltage is less than the comparative value. The captured charge storage voltage is thus compared to a presettable comparative value and the control signal is delivered if the charge storage voltage is less than the comparative value. This allows activating and deactivating the bypass circuit, respectively, as needed, for which purpose a corresponding comparative value is preset. It can be provided that only a single comparative value is provided. However, the comparative value can also be differently selected for activating and deactivating the bypass circuit, for example to be able to realize a hysteresis or the like with respect to the function. Moreover, the comparative value can of course also be adjustably formed such that adaptation to respective operating states is allowed depending on further circuit and/or function parameters. Moreover, the comparative value can also be provided by an electronic component, for example a threshold voltage of a transistor or the like, by means of which the bypass circuit can be activated and deactivated, respectively.

A development provides that the circuit assembly comprises a resistor network connected to the control unit for capturing the charge storage voltage. This allows capturing the charge storage voltage and evaluating it in terms of control in simple manner. In the simplest case, the resistor network can be formed by a voltage divider, which comprises two resistors connected in series, the series connection of which is connected in parallel with the charge storage. At a center tap of the series connection formed hereby, a partial voltage corresponding to the charge storage voltage can then be captured to be able to realize the intended function of the control unit.

The charge storage voltage is particularly advantageously captured by means of the resistor network, which provides the control signal at the same time. Thereby, a very simple control unit can be formed, which is for example only formed of passive electronic components, namely preferably at least of both electrical resistors of the series connection. Moreover, further, in particular passive, electronic components like electrical capacitors, electrical coils and/or the like can alternatively or additionally also be provided. Of course, the control unit does not have to be restricted hereto. It can also include active electronic components like transistors, operational amplifiers and/or the like. Furthermore, the control unit can of course also include or be formed of a computer unit for the intended operation, which cooperates with the resistor network and is correspondingly formed or adapted hereto, as already explained above.

A development provides that the control unit is at least partially encompassed by the load. Thus, the control unit can be at least partially formed integrally with the load. This is particularly advantageous if the control unit includes or is formed by a computer unit. If the load also includes a computer unit, thus, the computer unit thereof can at least partially also take over or provide the function of the control unit. Thereby, effort can be reduced.

According to a further configuration, it is proposed that the charge storage comprises a first and a second electrical capacitor, wherein an electrical switching unit for electrically coupling the two capacitors in switching manner is connected between the two capacitors, wherein the first capacitor is connected to the constant current circuit and the second capacitor is connected to the linear regulator circuit and the control unit is formed to capture a capacitor voltage at the second capacitor as the charge storage voltage. This configuration has the advantage that the second capacitor is only supplied with electrical energy via the switching unit if an electrical voltage at the first capacitor exceeds a preset comparative value. As a result, it can be achieved that a supply voltage for the load can be faster powered up. However, for a possible pulsed current supply of the load, the electrical energy can be drawn from both electrical capacitors. The switching unit can be connected to the control unit just as the bypass circuit. Correspondingly, the control unit then provides a switching signal, by means of which the switching unit can be controlled in suitable manner. For this purpose, the switching unit can for example include a switching transistor or the like.

Moreover, it is proposed that the switching unit is formed to capture a capacitor voltage at the first capacitor, to compare the captured value to a capacitor voltage comparative value and to electrically couple the first to the second capacitor if the capacitor voltage is greater than the capacitor voltage comparative value. Thereby, it is possible to be able to reliably switch on the load such that undesired possible undefined states in particular in switching on can be avoided or at least reduced. Alternatively, this function can of course also be provided by the control unit, which then correspondingly controls the switching unit by means of the switching signal.

A development provides that a value of the bypass current depends on a value of the charge storage voltage. Thus, the bypass current does not have to be a constant current in this configuration, but it can be selected depending on the charge storage voltage with respect to its value. This allows being able to react to the supply conditions for the load in correspondingly adapted manner, wherein retroactive effect on the voltage source can be kept as low as possible by the adapted reaction. For example, the value of the bypass current can be proportional to the charge storage voltage.

Furthermore, it can be provided that the bypass current includes current pulses. Therein, the current pulses of the bypass current can be selected such that retroactive effects on further loads connected to the voltage source can substantially be avoided. For example, the current pulses can be selected in high-frequency manner, preferably with a repetition frequency in the range of greater than about 500 Hz, preferably greater than about 1 kHz. This configuration is in particular suitable for the case that the control signal of the control unit is a digital signal, which can for example be provided by the computer unit. Thereby, a digital-analog conversion can be saved. Visible light fluctuations can be avoided by the high frequency, in particular if the illuminant is a light emitting diode or a laser scanner.

According to a further configuration, it is proposed that an electrical capacity of the charge storage is selected depending on an activation energy demand of the load. The activation energy demand of the load can for example be the energy demand, which is needed to supply the load with electrical energy from the switch-on point of time until the commencement of a continuous intended operation. Here, a greater amount of energy is usually required than for the further continuous intended operation of the load. This in particular applies if the load includes a computer unit. Moreover, the activation energy demand can also be formed by transferring the load from an idle state into an active state. Here too, an increased energy demand can be required.

The advantages and effects specified for the circuit assembly according to the invention equally apply to the lighting device equipped with the circuit assembly as well as also to the method according to the invention and vice versa.

BRIEF DESCRIPTION OF THE DRAWINGS

Further advantages and features are apparent from the following description of embodiments based on the attached figures. In the figures, identical reference characters denote identical features and functions.

DESCRIPTION OF THE PREFERRED EMBODIMENTS

Figure 1:
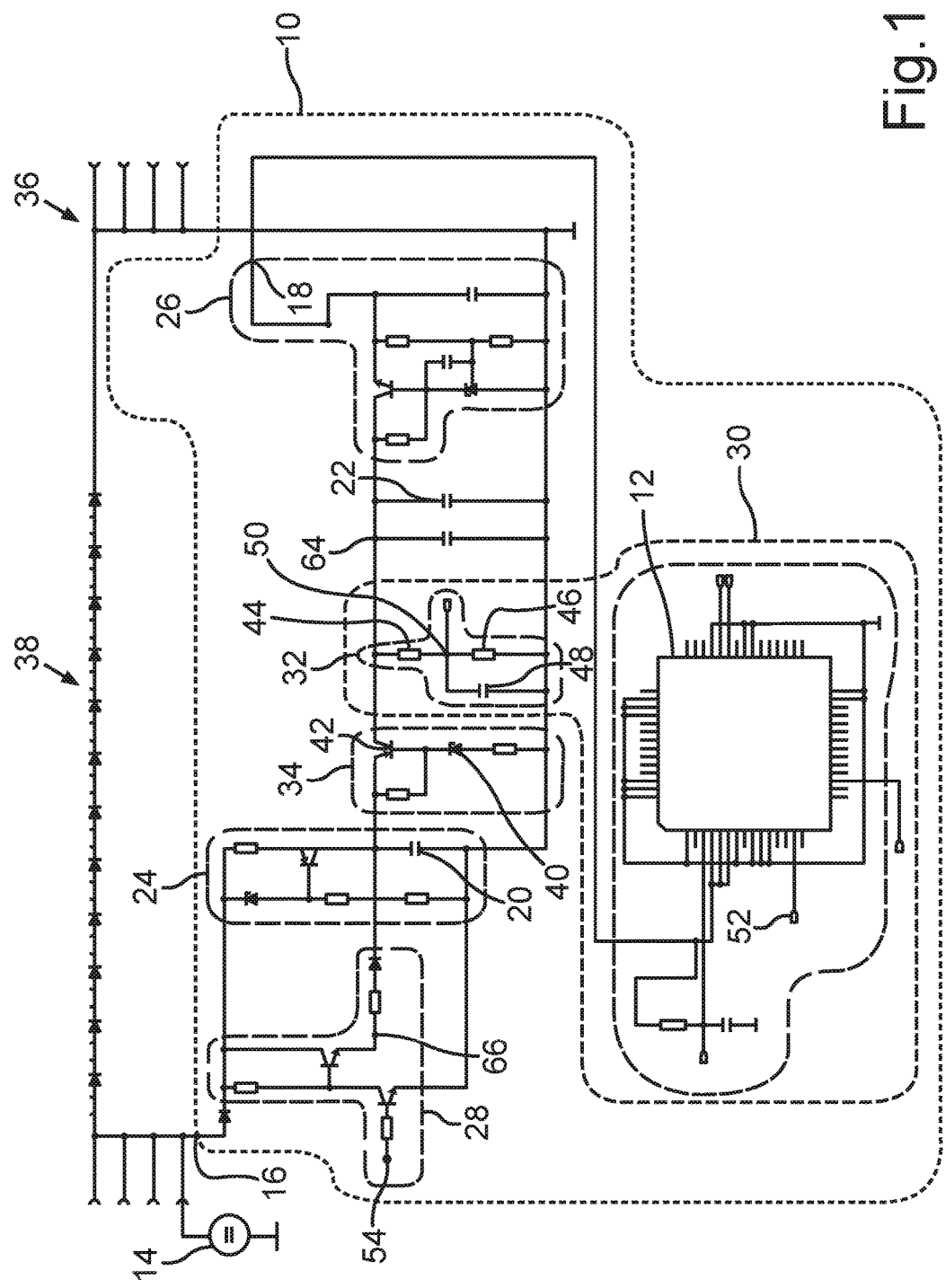
FIG. 1 is a schematic circuit diagram for a circuit assembly according to the invention.

FIG. 1 shows a lighting device 36 in a schematic circuit diagram view, which is presently a lighting device based on light emitting diodes. For this purpose, the lighting device 36 comprises light emitting diodes 38 as illuminant arranged in a construction not further illustrated. The light emitting diodes 38 are supplied with electrical energy from a voltage source 14, such that they emit light in intended manner. For this purpose, the lighting device 36, that is its voltage source 14, is connected to a public energy supply network not further illustrated, from which the electrical energy for the operation of the lighting device 36 is provided.

Further, the lighting device 36 includes an electrical load, which is presently formed by a computer unit 12, which provides a near-radio function, presently based on Bluetooth, to thereby provide a "smart" lighting device 36. The computer unit 12 is also supplied with electrical energy from the voltage source 14 for its intended operation. Presently, it is provided that the energy supply of the computer unit 12 is effected by means of a circuit assembly 10, which is connected to the voltage source 14 by an input terminal 16.

An output terminal 18 of the circuit assembly 10 is connected to the computer unit 12, that is an energy supply terminal of the computer unit 12.

The circuit assembly 10 serves for supplying the computer unit 12 with electrical energy from the voltage source 14. For this purpose, the circuit assembly 10 includes an electrical charge storage, which includes a first capacitor 20 and a second capacitor 22 for storing electrical charge. The charge storage, here the first capacitor 20, is electrically coupled to the input terminal 16 via a constant current circuit 24 and is supplied with a presettable electrical current by the constant current circuit 24. Presently, the electrical current is a constantly adjusted direct current. However, in alternative configurations, it can also be adequately differently adjusted, namely preferably depending on the energy demand of the computer unit 12. Moreover, the electrical current can also supply the second capacitor 22, as will be apparent in the following.

Further, the charge storage, here the second capacitor 22, is electrically connected to the output terminal 18 via a linear regulator circuit 26, which serves for providing a regulated electrical potential at the output terminal 18. Hereby, it is presently ensured that the computer unit 12 is supplied with a constant operating voltage.

A bypass circuit 28 is connected to the input terminal 16 and to the first capacitor 20 in parallel with the constant current circuit 24, which serves for supplying the charge storage, here in particular the capacitor 20, optionally also additionally the second capacitor 22, with an electrical bypass current. For this purpose, the bypass circuit 28 is controllable by means of a control signal of a control unit 30, which adequately provides the control signal.

An electrical switching unit 34 is connected between the two capacitors 20, 22 of the charge storage, which serves for electrically coupling the two capacitors 20, 22 in switching manner. Presently, the switching unit 34 is formed to capture a capacitor voltage at the first capacitor 20, to compare the captured value to a capacitor voltage comparative value and to electrically couple the first to the second capacitor 22 if the capacitor voltage is greater than the capacitor voltage comparative value.

For this purpose, the switching unit 34 includes a transistor 42 preferably operated in the switching operation, which is presently formed as a bipolar PNP transistor, as well as a reference element 40, which is presently formed as a Zener diode. If the capacitor voltage at the first capacitor 20 exceeds a capacitor voltage comparative value determined by the reference element 40, the transistor 42 switches to the turned-on state and thus establishes an electrically conducting connection between the first and the second capacitor 20, 22. In contrast, if the capacitor voltage at the first capacitor 20 decreases below the capacitor voltage comparative value, the transistor 42 switches in a turned-off state and disconnects the electrical connection between the first and the second capacitor 20, 22. By this circuit assembly, an advantageous functionality of the charge storage with respect to the intended operation can be achieved because this circuit assembly supports decoupling of the electrical energy supply between the voltage source 14 and the computer unit 12. In the turned-on state of the switching unit 34, accordingly, the second capacitor 22 can additionally also be supplied with the current of the constant current circuit 24 and the bypass current of the bypass circuit 28.

Presently, it is provided that the control unit 30 includes a resistor network 32 as well as that the control unit 30 is at least partially encompassed by the computer unit 12. The resistor network 32 comprises a series connection of two resistors 44, 46, wherein the series connection of the resistors 44, 46 is connected in parallel to the second capacitor 22. A capacitor 48 is further connected to a center tap 50 of the series connection formed by the electrical resistors 44, 46. It serves to stabilize and render interference-proof the electrical potential at the center tap 50. The center tap 50 is connected to the computer unit 12 in non-indicated manner.

Thus, a voltage signal is available in the computer unit 12, which corresponds to an electrical voltage at the second capacitor 22 of the charge storage. Thereby, the control unit 30 is capable of capturing the electrical charge storage voltage at the charge storage, here the second capacitor 22, and providing the control signal depending on the captured charge storage voltage.

For this purpose, the computer unit 12 further includes a corresponding computer program, which realizes the required functionality by the computer unit 12. Then, the corresponding control signal for the bypass circuit 28 is provided at a terminal 52 of the computer unit 12. For this purpose, the terminal 52 is connected to a terminal 54 of the bypass circuit in electrically conducting manner.

The computer unit 12, which includes the control unit 30, further provides a comparison function such that a comparison unit is formed. The comparison unit is formed such that the captured charge storage voltage is compared to a presettable comparative value and the control signal is delivered if the charge storage voltage is less than the comparative value. This means that the bypass circuit 28 is activated if the electrical voltage at the second capacitor 22 falls below a preset value, which is determined by the comparative value.

Even if it is presently provided that the computer unit 12 is a constituent of the control unit 30, it is also conceivable in an alternative configuration that the center tap 50 of the resistor network 32 is immediately connected to the terminal 54 of the bypass circuit 28. In this case, the control unit 30 is therefore exclusively formed by the resistor network 32. Thus, the resistor network 32 also immediately provides the control signal in this case.

Presently, it is further provided that a value of the bypass current, which is provided by the bypass circuit 28, depends on a value of the charge storage voltage, which is captured by means of the control unit 30. Thereby, the bypass current does not have to have a constant fixed value, but it can adequately vary. This allows reducing retroactive effects on the voltage source 14 such that undesired effects on the light emitting diodes 38 with respect to the light emission function can be reduced or largely avoided. Thus, it can for example be provided that a bypass current is not provided by the bypass circuit 28 at a charge storage voltage, which is greater than the comparative value. Only if the charge storage voltage falls below the comparative value, provision of bypass current is effected, wherein it can be provided that the bypass current is set greater with increasing deviation from the comparative value.

Moreover, it can of course also be provided that high-frequency current pulses can also be provided as the bypass current instead of a substantially continuous direct current, the frequency of which is selected such that retroactive effects on the voltage source 14 caused hereby substantially do not entail visible effects with respect to the light emission of the light emitting diodes 38. This is for example advantageous if the control signal is provided by the computer unit 12 and a digital-analog conversion is to be saved and the control signal is to immediately serve for controlling the bypass circuit 28.

Thus, it is possible by the invention to connect a load, presently the computer unit 12, to a voltage source 14, in particular if it represents a soft energy source. Thus, it is possible to also supply the load with a pulse-shaped current from the soft energy source, in particular if the load is to be supplied with electrical current in pulse-shaped manner.

For example, this case can occur if the computer unit 12 represented in FIG. 1 is not continuously operated, but in time division multiplex for example for reasons of energy saving. Thus, it can be provided that the computer unit 12 is only operated for a period of time of 20 milliseconds, whereupon a phase of the computer unit 12 without operation of about 1 second follows. This control mode is in particular suitable if the function of the computer unit 12 does not have to be continuously provided. In order to ensure a reliable function in the lighting device 36 in this operating behavior, a corresponding decoupling of the computer unit 12, that is its energy supply, from the voltage source 14 is achieved by the circuit assembly 10. The pulse-shaped current supply for the computer unit 12 can be provided by the circuit assembly 10 without having to supply the voltage source 14 with a corresponding pulsed current. A substantially continuous loading of the voltage source 14 can be achieved by the circuit assembly 10 although the computer unit 12 is to be supplied with current in pulse-shaped manner.

The division of the charge storage into the first and the second capacitor 20, 22 in particular also serves to be able to faster power up the supply voltage for the computer unit 12. However, the pulse-shaped current for supplying the computer unit 12 can also be drawn from both capacitors 20, 22.

The function of the circuit assembly 10 according to FIG. 1 is to be further explained based on the following figures.

Figure 2:
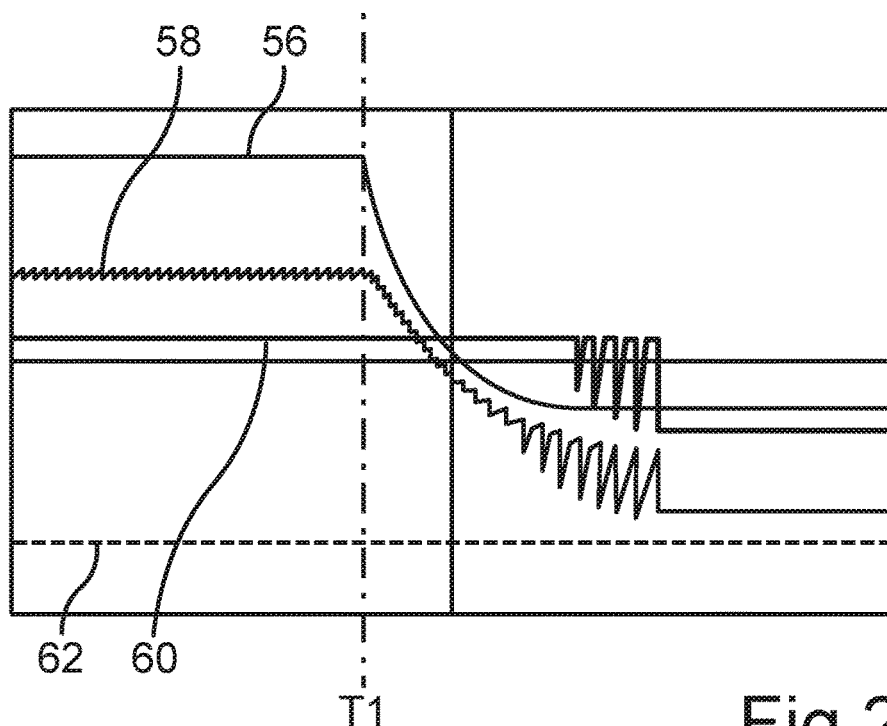
FIG. 2 shows, in a schematic signal representation, a drop of an electrical voltage of a voltage source without operation of the bypass circuit according to FIG. 1.

For this purpose, FIG. 2 shows a schematic signal diagram. The electrical voltage at the input terminal 16 of the circuit assembly 10 is represented by a graph 56 in FIG. 2. This corresponds to the electrical voltage provided by the voltage source 14. The voltage at a point 64 in the circuit assembly 10 according to FIG. 1 is represented by a graph 58, which corresponds to an electrical voltage at the second capacitor 22 of the charge storage. The electrical voltage at the output terminal 18 of the circuit assembly 10 is represented by a graph 60. A voltage at a point 66 of the circuit assembly 10, here in the area of the bypass circuit 28, is represented by a graph 62. The voltages represented by the graphs 56 to 62 are related to a reference potential, which is presently denoted by GND in FIG. 1.

In the representation according to FIG. 2, it is provided that the bypass circuit 28 is continuously deactivated. This is apparent by the graph 62, the voltage of which remains constantly on a low level, namely independently of the progression of the remaining voltages. Further, it is apparent from FIG. 2 that the voltage at the input terminal 16 drops at a point of time $T_1$, namely due to an energy requirement by the computer unit 12. As much energy is required as the voltage at the point 64, that is at the second capacitor 22, also correspondingly severely drops. The voltage drop goes as far as in the further course the voltage at the output terminal 18 can no longer be maintained by the linear regulator circuit 26 and first drops in terms of pulse until it then completely remains at a low value. Thus, it is apparent that the intended operation of the computer unit 12 is impeded by the voltage drop at the output terminal 18. Even disturbed states can occur, which make the intended function of the computer unit 12 impossible.

Figure 3:
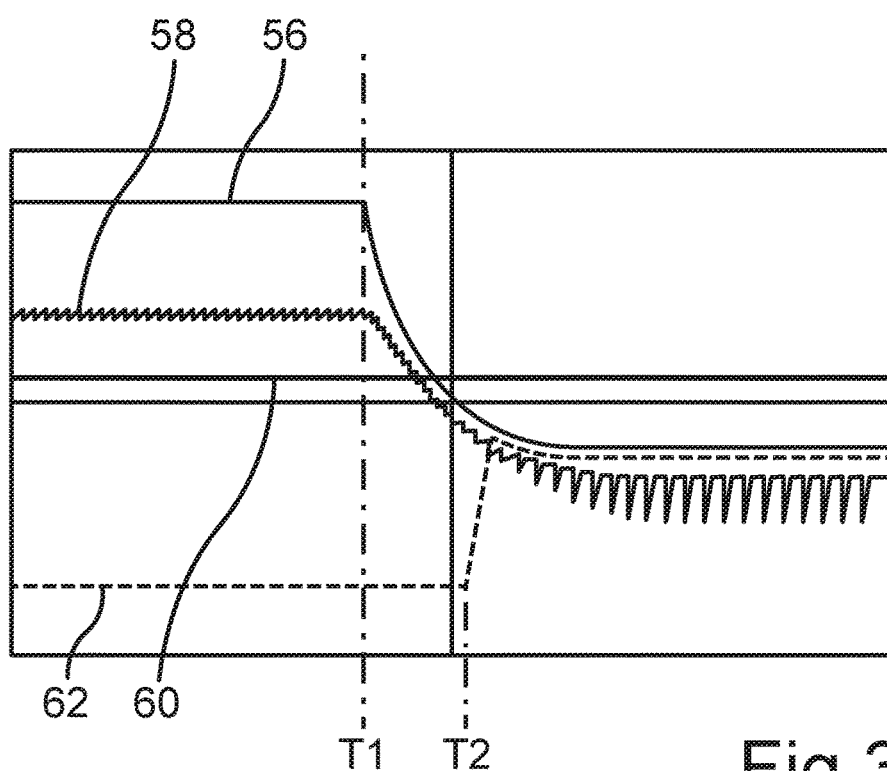
FIG. 3 is a schematic signal representation like FIG. 2, wherein the bypass circuit is now activated.

FIG. 3 shows a representation as FIG. 1, however, wherein here the bypass circuit 28 is now activated and intervenes in the function. The energy requirement of the computer unit 12 at the point of $T_1$ is again apparent, which results in drop of the electrical voltage of the voltage source 14. In contrast to the function according to FIG. 2, it is apparent from FIG. 3 that the bypass circuit 28 is activated at the point of time $T_2$. This is effected in that the computer unit 12 captures the electrical voltage at the point 64, that is the electrical voltage of the second capacitor 22, by means of the resistor network 32 and determines a corresponding voltage drop. Then, the computer unit 12 outputs a corresponding control signal to the bypass circuit 28, which activates the bypass current. This is apparent by a voltage increase at the point 66, which begins at the point of time $T_2$. Thereby, an additional bypass current is conveyed into the first capacitor 20 and consequently also into the second capacitor 22. As a result, it ensues that the voltage drop at the point 64 is considerably lower such that the linear regulator circuit 26 can maintain its intended continuous voltage supply operation as it is represented by the graph 60 in FIG. 3. Although the voltage drops according to the graphs 56 and 58, the voltage at the output terminal 18 can be kept constant according to the graph 60. Accordingly, the reliable operation of the computer unit 12 as a load is permanently ensured.

Figure 4:
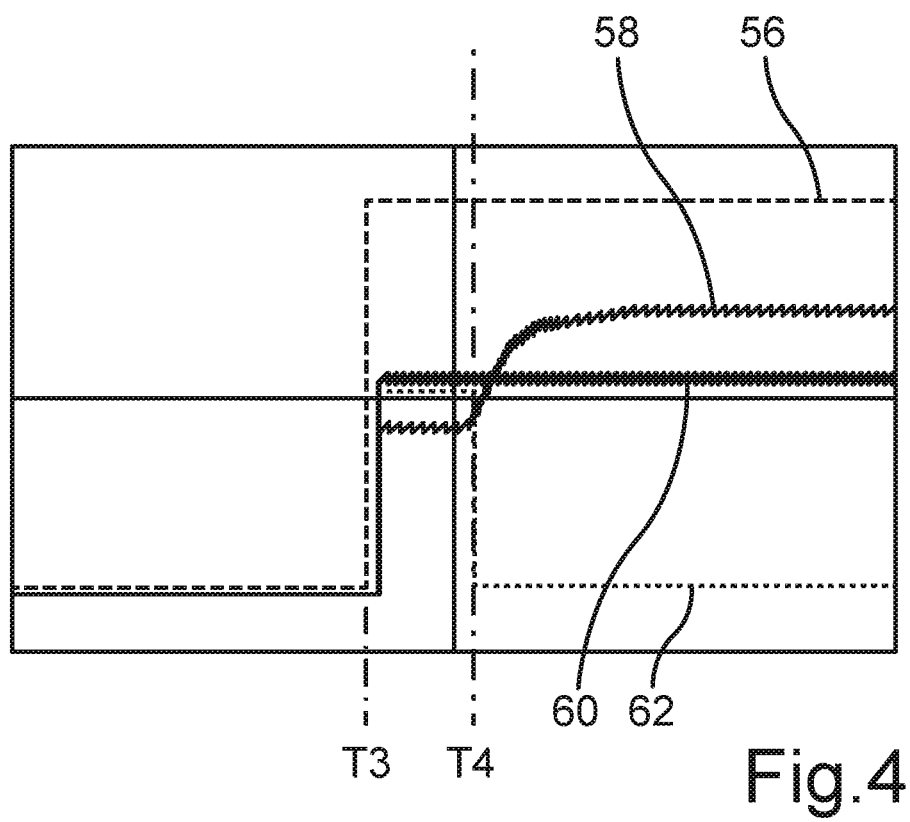
FIG. 4 is a schematic signal representation in a switch-on operation of the voltage source according to FIG. 1.

FIG. 4 shows a further function based on the circuit assembly 10 according to FIG. 1, however, wherein here the resistor network 32 is immediately connected to the terminal 54 of the bypass circuit 28 by its center tap 50. Thus, the computer unit 12 here does not intervene in the control of the bypass circuit 28.

In FIG. 4, a switch-on operation of the lighting device 36 overall is represented. From FIG. 4, the switch-on operation is apparent at a point of time $T_3$, at which the voltage provided by the voltage source 14 jumps to a preset value according to the graph 56. At the same time, the voltage at the point 64 also correspondingly steeply increases immediately after the point of time $T_3$, namely to a preset level. Similarly, the bypass circuit 28 is activated as is apparent by the graph 62. At a point of time $T_4$, the energy requirement by the computer unit 12 as a load has stabilized such that a continuous operation can be continued with lower energy consumption or the computer unit 12 is again deactivated. For this purpose, it is apparent by means of the graph 62 that the bypass circuit 28 is deactivated at the point of time $T_4$. Thus, current is now drawn only from the voltage source 14 by the constant current circuit 24 and supplied to the charge storage.

This configuration takes into account that the computer unit 12 has an increased current demand directly after starting. Presently, the current demand is greater than it is provided by the constant current circuit 24. Presently, a period of time of the high current flow is about 1.2 seconds. During this time, the voltage remains at a low level at the point 64 such that the bypass circuit 28 is activated by means of the resistor network 32 far enough to provide additional energy from the voltage source 14.

The embodiments only serve for explaining the invention and are not intended to restrict it. Thus, functions as well as also the circuit details of the circuit assemblies and the individual circuits can of course vary without departing from the basic idea of the invention. Moreover, the invention either is of course not restricted to the application in lighting devices, but can equally be provided in energy supplies, which are formed by a voltage source, in particular with high internal resistance.

Finally, it is to be noted that features, which are specified as device features, can equally also be formulated as method features and vice versa.

What is claimed is:

1. A circuit assembly for supplying an electrical load with electrical energy from a voltage source, the circuit assembly comprising:
    an input terminal for connecting to the voltage source,
    an output terminal for connecting to the load,
    an electrical charge storage for storing electrical charge,
    a constant current circuit electrically coupled to the input terminal and the charge storage for supplying the charge storage with a presettable electrical current,
    a linear regulator circuit electrically coupled to the charge storage and the output terminal for providing a regulated electrical potential at the output terminal,
    a bypass circuit controllable by operation of a control signal, which is electrically coupled to the input terminal and the charge storage in parallel with the constant current circuit, for supplying the charge storage with an electrical bypass current, and
    a control unit for providing the control signal,
    wherein the control unit is formed to capture an electrical charge storage voltage at the charge storage and to provide the control signal depending on the captured charge storage voltage.

2. The circuit assembly according to claim 1, wherein the control unit includes a comparison unit, which is formed to compare the captured charge storage voltage to a presettable comparative value and to deliver the control signal if the charge storage voltage is less than the comparative value.

3. The circuit assembly according to claim 1, further comprising a resistor network connected to the control unit for capturing the charge storage voltage.

4. The circuit assembly according to claim 3, wherein the control unit includes the resistor network and the resistor network is formed to provide the control signal.

5. The circuit assembly according to claim 1, wherein the control unit is at least partially encompassed by the load.

6. The circuit assembly according to claim 1,
    wherein the charge storage comprises a first and a second electrical capacitor,
    wherein an electrical switching unit for electrically coupling the two capacitors in a switching manner is connected between the two capacitors,
    wherein the first capacitor is connected to the constant current circuit and the second capacitor is connected to the linear regulator circuit and the control unit is formed to capture a capacitor voltage at the second capacitor as the charge storage voltage.

7. The circuit assembly according to claim 6, wherein the switching unit is formed to capture a capacitor voltage at the first capacitor, to compare the captured value to the capacitor voltage comparative value and to electrically couple the first to the second capacitor if the capacitor voltage is greater than the capacitor voltage comparative value.

8. A lighting device comprising:
    an illuminant,
    a voltage source for supplying the illuminant and an electrical load with electrical energy, and
    a circuit assembly for electrically coupling the voltage source to the electrical load,
    wherein the circuit assembly comprises:
        an input terminal for connecting to the voltage source,
        an output terminal for connecting to the load,
        an electrical charge storage for storing electrical charge, a constant current circuit electrically coupled to the input terminal and the charge storage for supplying the charge storage with a presettable electrical current, a linear regulator circuit electrically coupled to the charge storage and the output terminal for providing a regulated electrical potential at the output terminal, a bypass circuit controllable by operation of a control signal, which is electrically coupled to the input terminal and the charge storage in parallel with the constant current circuit, for supplying the charge storage with an electrical bypass current, and a control unit for providing the control signal, wherein the control unit is formed to capture an electrical charge storage voltage at the charge storage and to provide the control signal depending on the captured charge storage voltage.

9. A method for supplying an electrical load with electrical energy from a voltage source, the method comprising:

supplying an electrical charge storage for storing electrical charge with a preset electrical current by operation of a constant current circuit connected to the voltage source, providing a regulated electrical potential for the load by operation of a linear regulator circuit connected to the charge storage, supplying the charge storage with an electrical bypass current in parallel with the current of the constant current circuit by operation of a bypass circuit, controlling the bypass circuit by operation of a control signal of a control unit, and capturing an electrical charge storage voltage at the charge storage and providing the control signal depending on the captured charge storage voltage.

10. The method according to claim 9, further comprising comparing the captured charge storage voltage to a presettable comparative value and delivering the control signal if the charge storage voltage is less than the comparative value.

11. The method according to claim 9, wherein the charge storage voltage is captured by operation of a resistor network, which provides the control signal at the same time.

12. The method according to claim 9, wherein a value of the bypass current depends on a value of the charge storage voltage.

13. The method according to claim 9, wherein the bypass current includes current pulses.

14. The method according to claim 9, further comprising selecting an electrical capacity of the charge storage depending on an activation energy demand of the load.

* * * * *